United States Patent
Brown et al.

(10) Patent No.: US 9,845,155 B2
(45) Date of Patent: Dec. 19, 2017

(54) SYSTEMS AND METHODS FOR CONVEYING PASSENGERS, FLIGHT CREW PERSONNEL, CONTAINERS AND FOOD SERVICE CARTS

(71) Applicant: The Boeing Company, Chicago, IL (US)

(72) Inventors: Douglas A. Brown, Edmonds, WA (US); Karen L. Hills, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 172 days.

(21) Appl. No.: 14/988,505

(22) Filed: Jan. 5, 2016

(65) Prior Publication Data
US 2017/0190424 A1    Jul. 6, 2017

(51) Int. Cl.
| B64C 1/20 | (2006.01) |
| B64D 9/00 | (2006.01) |
| B66B 11/02 | (2006.01) |
| B66B 11/00 | (2006.01) |
| B66B 19/00 | (2006.01) |
| B66B 9/04 | (2006.01) |
| B64C 1/00 | (2006.01) |

(52) U.S. Cl.
CPC ............ B64D 9/00 (2013.01); B66B 9/04 (2013.01); B66B 11/0005 (2013.01); B66B 11/0226 (2013.01); B66B 19/00 (2013.01); B64C 2001/0027 (2013.01)

(58) Field of Classification Search
CPC ................. B64D 11/00; B66B 9/04
See application file for complete search history.

(56) References Cited

U.S. PATENT DOCUMENTS

| 4,653,707 A * | 3/1987 | Hamilton | ............ B64D 9/00 187/264 |
| 5,583,326 A | 12/1996 | Sors | |
| 2011/0084172 A1* | 4/2011 | Fairchild | ............ B64D 9/00 244/137.1 |

OTHER PUBLICATIONS

Pneumatic Vacuum Elevators LLC; Typical Home Installation for a 2stop elevator; https://s3-us-wes-2.amazonaws.com/triton-cdn-files/Vacuum/2STOPMODELUB237.pdf Jul. 22, 2011
European Patent Office; Extended European Search Report; European Patent Application No. 16206143.6 dated May 16, 2017.

* cited by examiner

Primary Examiner — Richard G Davis
(74) Attorney, Agent, or Firm — Parsons Behle & Latimer (57) ABSTRACT

An elevator system includes a shaft extending between at least two decks of a vehicle. A base of the shaft is mounted to a deck structure of at least two decks by a coupling mechanism that accommodates flexing of the deck structure to enable the deck structure to flex independently of the base of the shaft. The elevator system further includes a cab within the shaft. The cab is movable between the at least two decks. The elevator system also includes a pneumatic system in selective communication with an interior of the shaft.

20 Claims, 6 Drawing Sheets

SYSTEMS AND METHODS FOR CONVEYING PASSENGERS, FLIGHT CREW PERSONNEL, CONTAINERS AND FOOD SERVICE CARTS

FIELD OF THE DISCLOSURE

The present disclosure relates generally to the field of pneumatic elevator systems and in particular to systems and methods for conveying passengers, flight crew personnel, containers and food service carts.

BACKGROUND

For multi-deck aircraft, it may be beneficial to enable access between decks. For example, sleeping areas, for passengers or crew, may be located in a lower lobe area or a crown area of an aircraft. Further, food service carts and other containers may be stored in a cargo compartment below a passenger deck.

Staircases may enable passengers and crew to move from one deck to another deck. However, carts may be difficult to move up and down a staircase. Further, staircases may take up too much space for some commercial aircraft. Food carts and other containers may not be easily moved between decks using a staircase.

In some cases, a lift system may be installed in an aircraft to facilitate the movement of passengers, crew, or containers between decks. Typical lift vehicle lift systems use motorized lift mechanisms, such as a screw system to drive an elevator cab. Such systems may be loud, prone to jamming, and require excessive maintenance. Other disadvantages of current lift systems may exist. What may be beneficial is a lift system that is quieter, simpler, less prone to jamming, and easier to maintain than typical motorized lift mechanisms.

SUMMARY

Disclosed herein is pneumatic lift system for use aboard commercial aircraft. Applications of the pneumatic lift system include (but are not limited to) passenger elevator, flight crew elevator and/or container/food service cart elevator. The lift system may be used to transport flight crew to lower lobe sleeping quarters or crown area sleeping quarters. It may be used to transport flight crew, containers, and food service carts between decks, both lower lobe and crown area stowage. It may be also be used to transport passengers between decks. The disclosed system may overcome one or more of the shortcomings associated with typical aircraft elevator systems.

In an embodiment, an elevator system includes a shaft extending between at least two decks of a vehicle. A base of the shaft is mounted to a first deck structure of the at least two decks by a coupling mechanism that accommodates flexing of the first deck structure to enable the first deck structure to flex independently of the base of the shaft. The system further includes a cab within the shaft. The cab is movable between the at least two decks. The system also includes a pneumatic system in selective communication with an interior of the shaft.

In some embodiments, the pneumatic system may include a vacuum pump that generates a pneumatic force. The pneumatic system may further include a noise-reducing enclosure surrounding the vacuum pump. The pneumatic system may also include a valve that generates a pneumatic force using a pressure differential between a cabin of the vehicle and an exterior of the vehicle. In some embodiments, the pneumatic system may include a valve that generates a pneumatic force using bleed air generated by a turbine engine. The pneumatic system may be part of a vehicle waste system.

In some embodiments, the elevator system further includes an emergency escape rope fixed to a top of the shaft. The elevator system may also include an emergency hatch in at least one surface of the cab to enable egress of passengers and crewmembers.

In some embodiments, the cab may include tension cables suspending a floor of the cab from a ceiling of the cab. In some embodiments, the cab, the shaft, or both may be constructed from a fiber-wound material. In some embodiments, the shaft is constructed from a honeycomb panel material.

In an embodiment, a method of installing an elevator system includes mounting a base of a shaft to a first deck structure of a vehicle with a coupling mechanism that accommodates flexing of the first deck structure to enable the first deck structure to flex independently of the base of the shaft. The method further includes installing a cab within the shaft. The method also includes providing a pneumatic system in selective communication with an interior of the shaft.

In some embodiments, mounting the base of the shaft to the first deck structure includes positioning at least one bracket with a U-shaped portion that complements a shape of the base of the shaft to retain a portion of the base of the shaft and fixing the at least one bracket to the first deck structure. In some embodiments, mounting the base of the shaft to the first deck structure includes attaching the base of the shaft to the first deck structure with at least one tie-rod having elastomeric dampers. In some embodiments, mounting the base of the shaft to the first deck structure includes attaching the base of the shaft to the first deck structure with at least one slide bearing. In some embodiments, mounting the base of the shaft to the first deck structure includes attaching a buffer panel to the first deck structure and fixing the base of the shaft to the buffer panel.

In some embodiments, the method also includes mounting the shaft to a second deck structure of the vehicle with a second coupling mechanism that enables the second deck structure to flex independently of the shaft. In some embodiments, mounting the shaft to the second deck structure includes attaching the shaft to the second deck structure using at least one cord that resists tension forces. In some embodiments, mounting the shaft to the second deck structure includes mounting the shaft to the second deck structure with at least one rotational bumper that retains the shaft within an opening in the second deck structure while enabling the shaft to move in a direction perpendicular to the second deck structure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Figure 1:
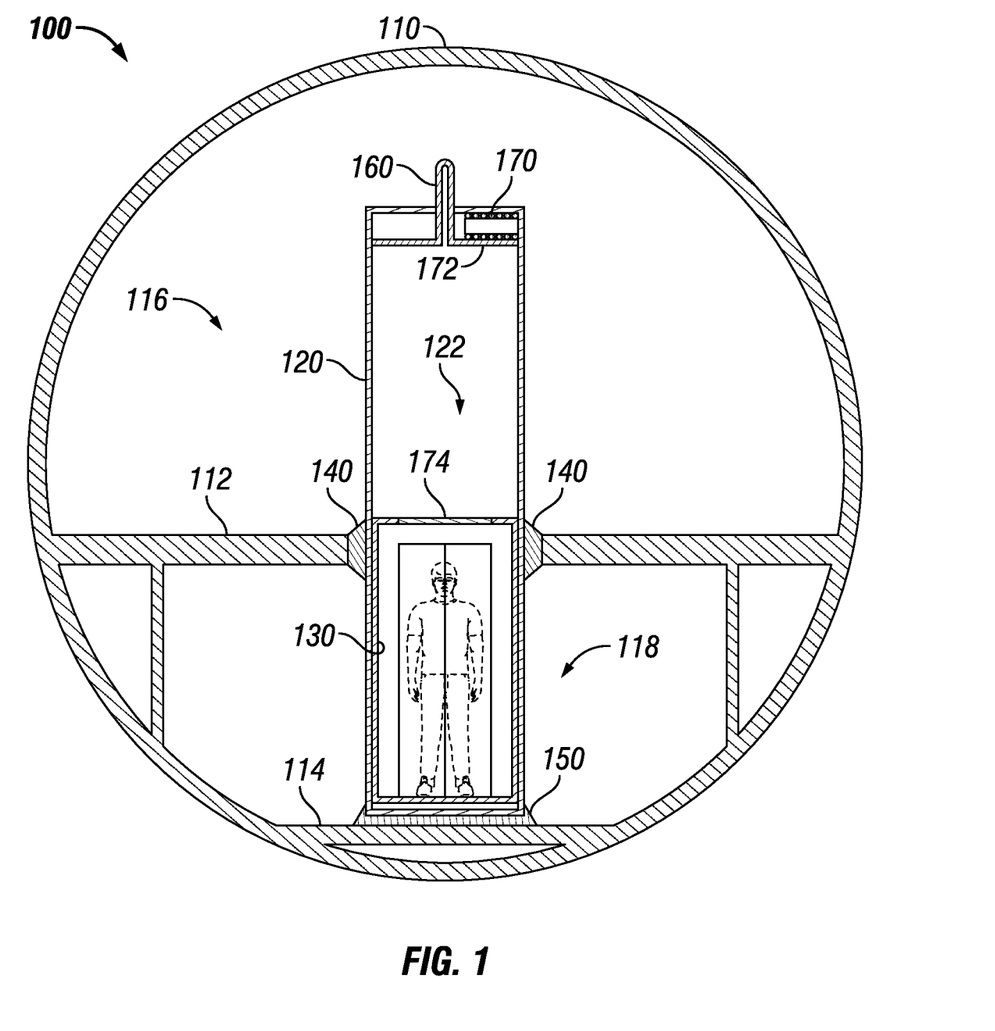
FIG. 1 is a cross-section diagram of an embodiment of a lift system in a lowered cab position.

Referring to FIG. 1, a cross-section diagram of an embodiment of a lift system 100 is depicted. The lift system 100 may be installed within a fuselage 110 of an aircraft. The fuselage may include multiple deck structures 112, 114. The deck structure 112 may separate an upper deck compartment 116 from a lower deck compartment 118. In an embodiment, the upper deck compartment 116 may be a passenger deck compartment and the lower deck compartment 118 may be a cargo deck compartment. Alternatively, both the deck compartments 116, 118 may be passenger deck compartments. For example, the deck compartment 118 may house passenger or crew sleeping quarters. For illustrative purposes, the deck structure 112 may be both a floor of the deck compartment 116 and a ceiling of the deck compartment 118. The deck structure 114 may be a floor of the lower deck compartment 118.

The lift system 100 may include a shaft 120 and a cab 130. The shaft 120 may extend between the upper deck compartment 116 and the lower deck compartment 118. For example, an interior 122 of the shaft may include an unbroken space between the deck compartments 116, 118. In order to make room for the shaft 120, portions of the deck structure 112 may be removed and intercostals may be installed to maintain the structural integrity of the deck structure 112. As such, the deck structure 112 may include all beams, intercostals, or other structures that maintain a separation between the deck compartments 116, 118.

The cab 130 may be installed and positioned within the interior 122 of the shaft 120. Further, the cab 130 may be movable between the deck compartments 116, 118. The cab 130 may fit within the shaft 120 so as to enable a pressure differential to develop between the space above the cab 130 and the space below the cab 130, thereby causing the cab 130 to move within the shaft 120. In some embodiments, the cab may include a seal to separate the pressure above the cab 130 from the pressure below the cab 130.

A pneumatic connector 160 may be in communication with the interior 122 of the shaft 120. The pneumatic connector 160 may be part of a pneumatic system and may enable selective communication between the pneumatic system and the interior 122 of the shaft 120. The pneumatic system may include mechanisms to generate a pressure differential within the interior 122 of the shaft 120 as further described with reference to FIG. 3.

When an air pressure above the cab 130 and below the cab 130 is equalized, or when the air pressure below the cab 130 is lower than the air pressure above the cab 130, the cab 130 may descend, due to gravity, and come to rest adjacent to the deck compartment 118 as depicted in FIG. 1. During operation of the lift system 100, air may be removed from the interior 120 of the shaft 122 via the pneumatic connector 160. The removal of the air may create a pressure differential where an air pressure above the cab 130 is lower than an air pressure below the cab 130. The pressure differential may exert a pneumatic force on the cab 130 causing it to move in an upward direction.

Figure 2:
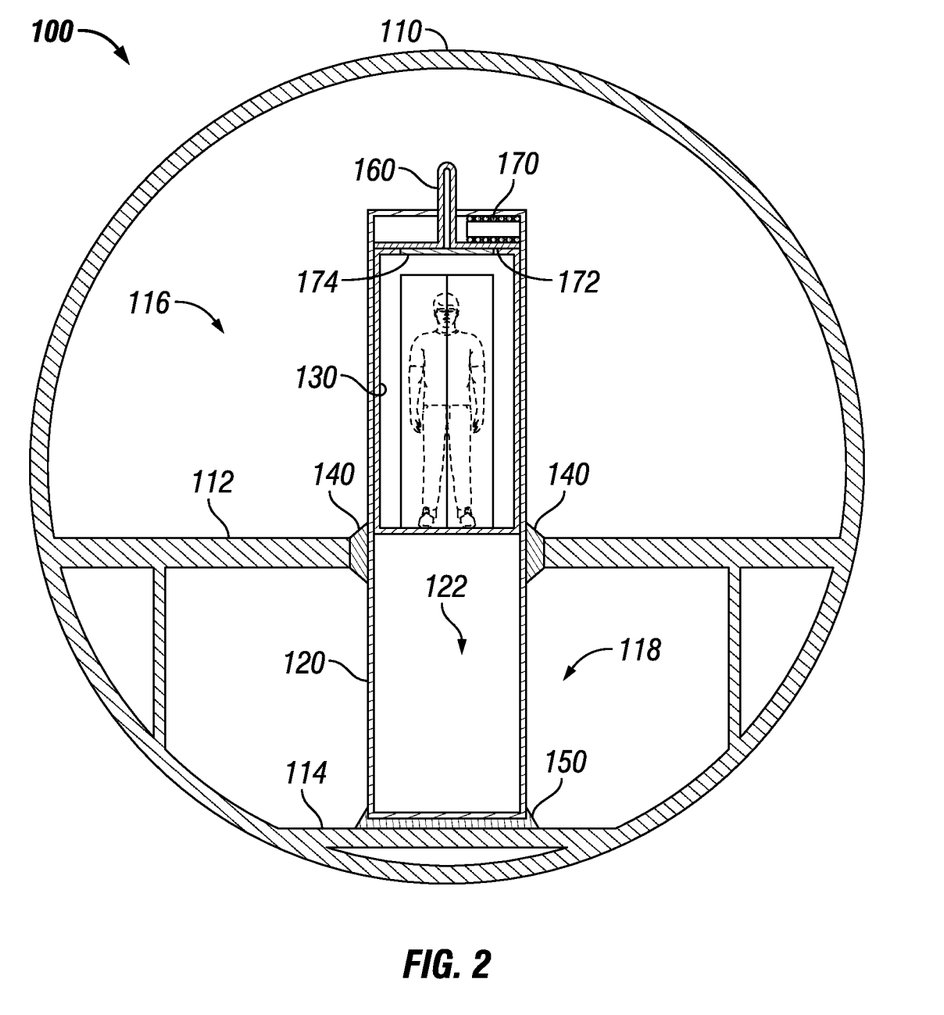
FIG. 2 is a cross-section diagram of an embodiment of a lift system in a raised cab position.

As depicted in FIG. 2, the cab 130 may move upward until it becomes adjacent with the upper deck compartment 116. In this way, the cab 130 acts as an elevator and may lift people and supplies from the lower deck compartment 118 to the upper deck compartment 116. The air pressure above the cab 130 and the air pressure below the cab 130 may then be permitted to equalize, causing the cab 130 to descend again to the lower deck compartment 118.

By using a pneumatic elevator, the system 100 may be quieter and more robust, as compared to systems that rely on gear-based elevators. Further, the lift system 100 may be more compact as compared to gear-based elevators or stair cases. Other benefits and advantages of the lift system 100 may be readily apparent to persons of ordinary skill in the art having the benefit of this disclosure.

In some embodiments, the lift system 100 may include safety measures. For example, the lift system 100 may include an emergency cord 170. The emergency cord 170 may be stored within an emergency compartment 172 and may be attached to a top of the shaft 120.

The system 100 may further include an emergency hatch 174 in at least one surface of the cab 130. For example, the emergency hatch 174 may be in the top of the cab 130. Although not shown in FIG. 1, in some embodiments, the bottom of the cab 130 may additionally or alternatively include an emergency hatch.

In the case of a malfunction of the lift system 100, the emergency hatch 174 may be opened to enable egress of passengers and crewmembers from the lower deck compartment 118 to the upper deck compartment 116. The compartment 172 may be opened and the cord 170 may be lowered to enable a trapped passenger or crewmember to climb up to safety.

The emergency cord 170 and the emergency hatch 174 may be particular beneficial in cases where other methods of moving between the upper deck compartment 116 and the lower deck compartment 118 do not exist, or have been removed. For example, due to space or weight limitations, the lift system 100 may be installed within an aircraft instead of a staircase, leaving the lift system 100 as the only way to move between the deck compartments 116, 118. In such a case, the emergency hatch 174 may still permit movement between the deck compartments 116, 118 in the event of lift failure.

In some embodiments, the shaft 120 may be mounted to the deck structure 112 with a coupling mechanism 140 that accommodates flexing of the deck structure 112. By accommodating flexing, the coupling mechanism 140 may enable the deck structure 112 to flex independently of the shaft 120. Likewise, a base of the shaft 120 may be mounted to the deck structure 114 with a coupling mechanism 150 that accommodates flexing in order to enable the deck structure 114 to flex independently of the base of the shaft 120.

During a flight, the aircraft fuselage 110 may flex due to various forces applied to the aircraft. For example, changes in direction, changes in thrust, wind patterns, and turbulence may cause flexing or shuttering through the fuselage 110. Because the fuselage is fixed to the deck structures 112, 114, they may be subject to flexing as well. Excessive flexing may cause the shaft 120 to fracture or become misshapen. Further, unless isolated from the deck structures 112, 114, the shaft 120 may cause unanticipated resistance to the flexibility of the fuselage 110. By accommodating flexing of the deck structures 112, 114 at the coupling mechanisms 140, 150, the lift system 100 may avoid these shortfalls. Examples of embodiments of the coupling mechanism 150 are described with reference to FIGS. 8-11 and examples of embodiments of the coupling mechanism 140 are described with reference to FIGS. 12-15.

Figure 3:
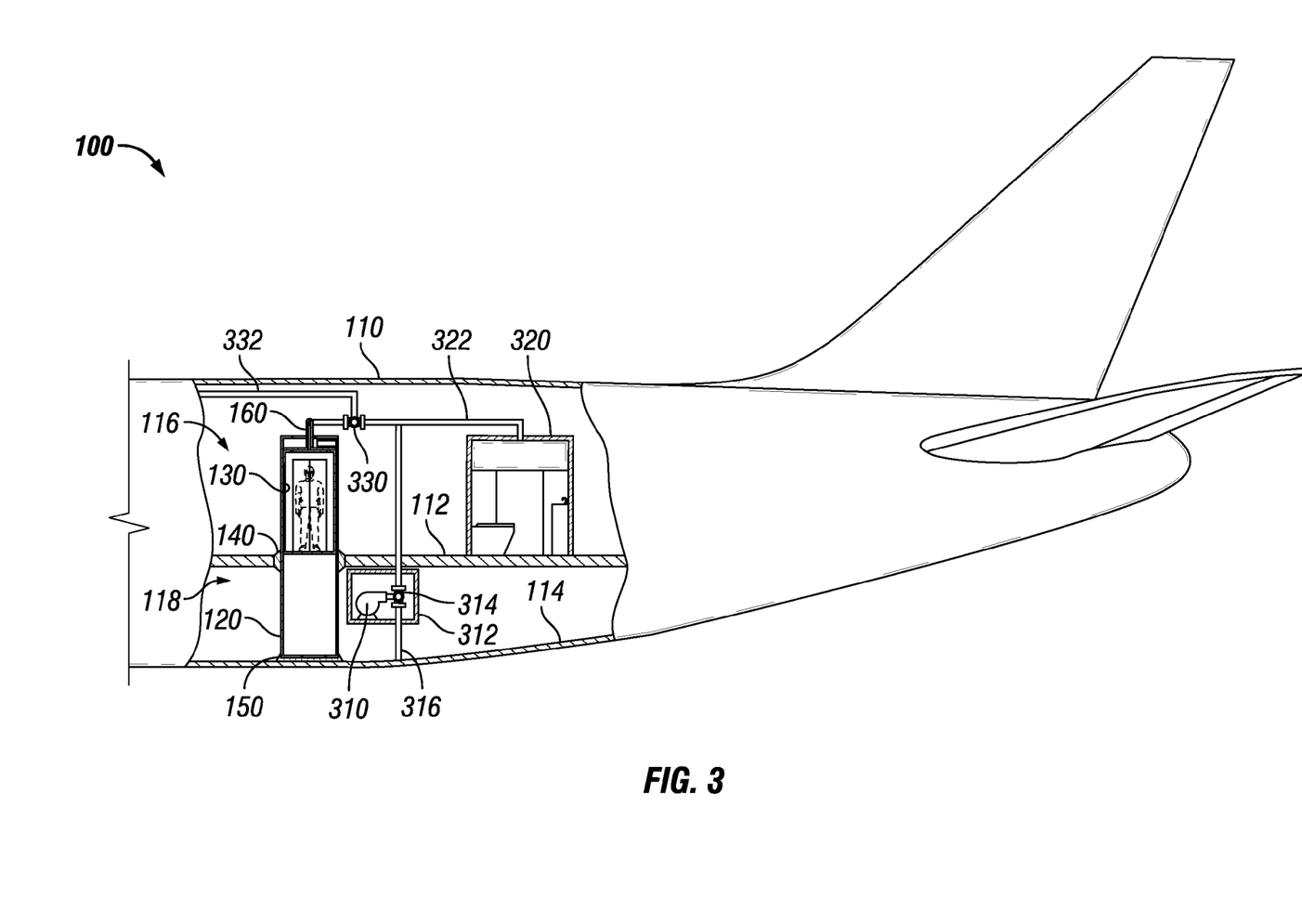
FIG. 3 is a side-view diagram of an embodiment of a lift system within an airplane fuselage.

Referring to FIG. 3, the system 100 is depicted in a side view within the airplane fuselage 110. A pneumatic force may be generated and applied to the cab 130 via one or more pneumatic systems connected to the pneumatic connector 160. For example, the lift system 100 may include a vacuum pump 310 and a noise reducing enclosure 312 surrounding the vacuum pump 310. The vacuum pump 310 may generate a pneumatic force which may be selectively applied to the cab 130 via the pneumatic connector 160 using a valve 314.

As another example, an exterior connector 316 may be selectively placed in communication with the pneumatic connector 160 using the valve 314. While the aircraft is in flight, a pressure outside of the fuselage 110 may be less than a pressure inside the shaft 120. By connecting the exterior connector 316 to the pneumatic connector 160, a pressure differential between a cabin of the aircraft and the exterior of the aircraft may be used to generate a pneumatic force on the cab 130. In some embodiments, the vacuum pump 310 may be used to move the cab 130 while the aircraft is on the ground and the pressure differential between the cabin and the exterior of the aircraft may be used while the aircraft is airborne.

Many large commercial aircraft already include vacuum operated waste systems. In some embodiments, the vacuum pump 310 may be part of an aircraft waste system. For example, the aircraft may include a lavatory 320 and a vehicle waste connector 322. The vacuum pump 310 may be used to generate a pneumatic force for both the lift system 100 and the lavatory 320. The valve 330 may selectively apply the pneumatic force to the cab 130.

As yet another example of a pneumatic system that may be used to move the cab 130, a valve 330 may selectively place the pneumatic connector 160 in communication with a bleed air connector 332. The bleed air connector 332 may rely on bleed air generated by a turbine engine of the airplane to generate a negative airflow and thereby create a pneumatic force.

In some embodiments, multiple pneumatic systems may be used in combination to move the cab 130. For example, in some embodiments, a combination of the vacuum pump 310 and the exterior connector 160 may be used to generate the pneumatic force. In other embodiments, the pneumatic force may be generated using a combination of the vacuum pump 310 and the bleed air connector 332. In yet other embodiments, a combination of the exterior connector 160 and the bleed air connector 332 may be used. As such, the vacuum pump 310, the exterior connector 160, the bleed air connector 332, another type of pneumatic system, or any combination thereof may be used to generate the pneumatic force for moving the cab 310.

An advantage of using existing systems, such as the lavatory 320 or the bleed air connector 332 to generate the pneumatic force to move the cab 130 is that additional parts, which may contribute to added weight to the aircraft, are not required. As such, the lift system 100 may be implemented without additional stress on the currently limited resources associated with air travel.

Figure 4:
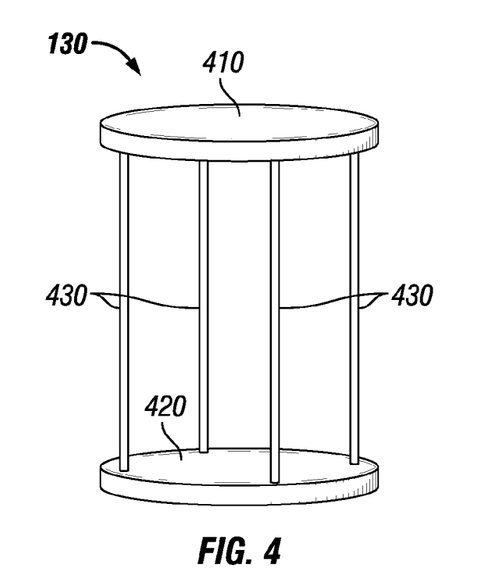
FIG. 4 is a diagram depicting an embodiment of a cab that includes tension cables for use with a lift system.

Referring to FIG. 4, an embodiment of the cab 130 is depicted. The cab 130 may include a ceiling 410 and a floor 420. The floor 420 may be suspended from the ceiling via tension cables 430. In this embodiment, the cab 130 may not have walls. The ceiling of the cab 130 may be fitted into the shaft 120 tightly enough to form a vacuum above the ceiling while the pressure within the cab is unchanged. The vacuum formed above the ceiling 410 may create an upward force on the ceiling 410 which in turn pulls the floor 420 up via the tension cables 130. An advantage of this embodiment is that the cab 130 may be lighter as compared to a cab that includes walls or other side structures.

Figure 5:
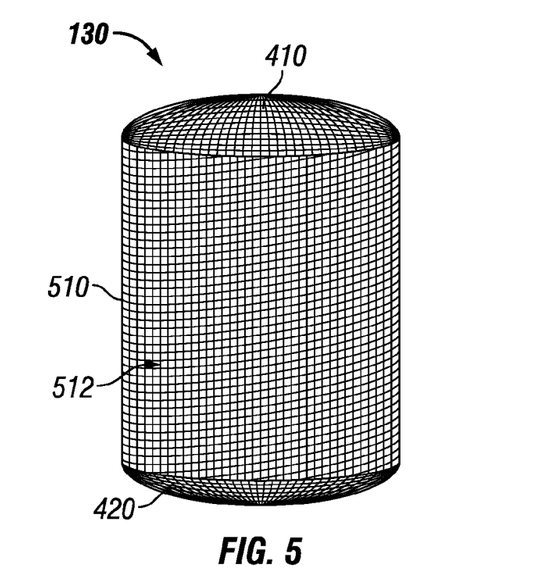
FIG. 5 is a diagram depicting an embodiment of a cab that includes a fiberwound material for use with a lift system.

Referring to FIG. 5, an embodiment of the cab 130 is depicted. In this embodiment, the cab 130 includes a cylindrical wall 510. The ceiling 410, the floor 420, and the wall 510 may be formed from a composite, such as a fiberwound material 512. For example, a mandrel winding process may be used to form the cab 120 from a composite fiber. Using a fiberwound material may enable the cab 130 to be sturdy, yet light weight. As such, by including the wall 510, the cab 130 may be stronger, sturdier, and more protective than embodiments that do not include walls, yet may still be relatively light weight when compared with embodiments that use other materials to construct the cab walls. In some embodiments, a doorway may be cut into the wall 510. In other embodiments, the wall 510 may be wound in such a way as to leave an opening for a doorway.

Figure 6:
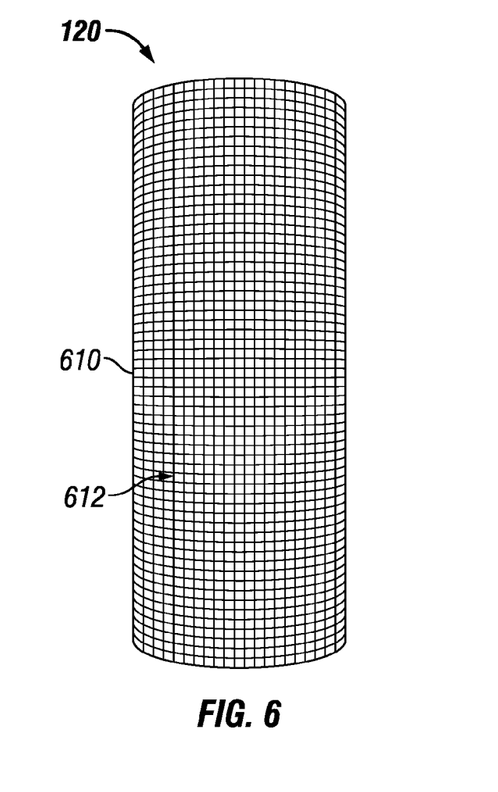
FIG. 6 is a diagram depicting an embodiment of a shaft that includes a fiberwound material for use with a lift system.

Referring to FIG. 6, an embodiment of the shaft 120 is depicted. In this embodiment, the shaft 120 may include a wall 610 formed from a composite, such as a fiberwound material 612. As with the cab 130, a mandrel winding process may be used to form the shaft 120 from a composite fiber. The fiberwound material may enable the wall 610 to be lightweight yet sturdy as compared to other materials, such as a polycarbonate material.

Figure 7:
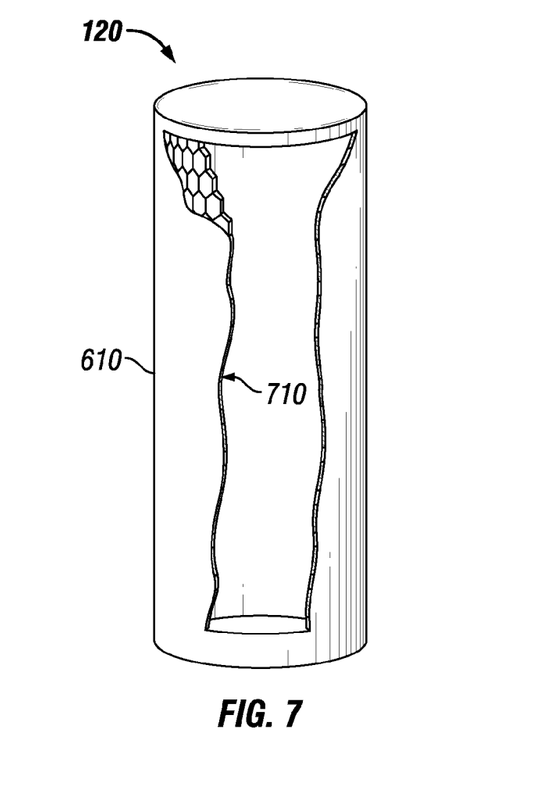
FIG. 7 is a diagram depicting an embodiment of a shaft that includes a honeycomb paneling for use with a lift system.
Figure 8:
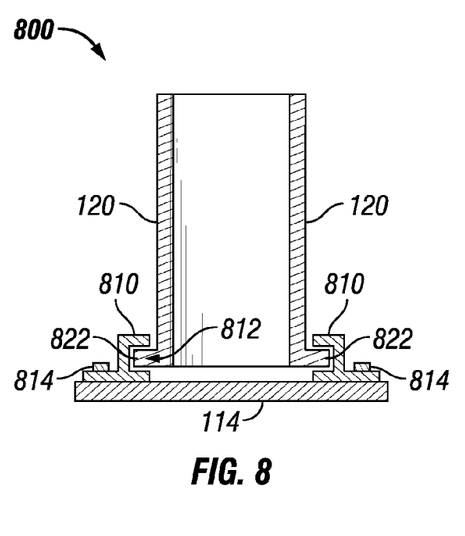
FIGS. 8-11 are diagrams depicting embodiments of a coupling mechanism for coupling the base of a shaft usable with a lift system to a deck structure.

Referring to FIG. 7, another embodiment of the shaft 120 is depicted. In this embodiment, the shaft 120 may be formed from one or more honeycomb panels 710. The honeycomb panel shape may add significate strength to the wall 610 while only adding nominal weight.

Referring to FIGS. 8-15, a number of coupling mechanisms incorporating elastomerics and/or slide bearings to accommodate flex and floor deflections relative to the shaft 120 are described. For example, referring to FIG. 8, an embodiment of a coupling mechanism 800 for coupling the base of the shaft 120 to the deck structure 114 is depicted. In this embodiment, the coupling mechanism 800 may include a bracket 810 with a u-shaped portion 812. The u-shaped portion may complement a shape of the base of the shaft 120. For example, the base of the shaft 120 may include a lip 822. The lip 822 may be encased within the u-shaped portion 812. The bracket 810 may be positioned to retain the lip 822 and the bracket 810 may be fixed to the deck structure 114 using a fastener 814. While encased within the u-shaped portion 812, the lip 812 may be able to shift within the bounds of the bracket 810 while still being retained. Thus, as the deck structure 114 flexes, the base of the shaft 120 does not flex with it. As such, the bracket 810 enables the deck structure 114 to flex independent of the base of the shaft 120.

Figure 9:
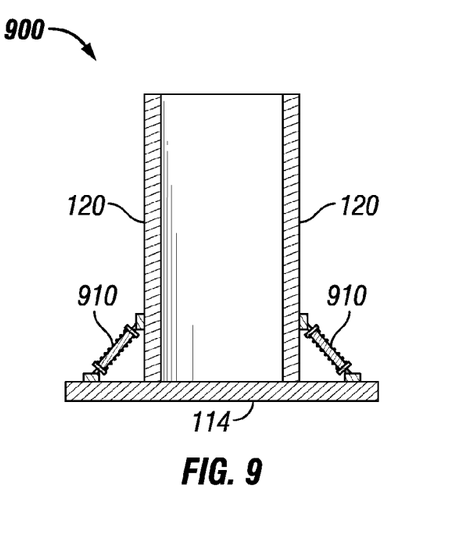

Referring to FIG. 9, an embodiment of a coupling mechanism 900 for coupling the base of the shaft 120 to the deck structure 114 is depicted. In this embodiment, the coupling mechanism 900 may include one or more tie rods 910. The tie-rods 910 may include elastomeric, in-line dampening elements to accommodate flexing and shifting. The tie-rods 910 may be attached to the base of the shaft 120 and to the deck structure 114 allowing some flexibility therebetween. The flexibility of the tie-rods 910 may enable the deck structure 114 to flex independent of the base of the shaft 120.

Figure 10:
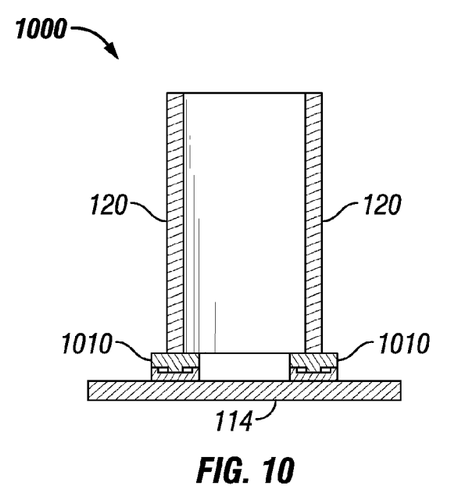

Referring to FIG. 10, an embodiment of a coupling mechanism 1000 for coupling the base of the shaft 120 to the deck structure 114 is depicted. In this embodiment, the coupling mechanism 1000 may include one or more slide bearings 1010. The base of the shaft 120 may be attached to and rest on the slide bearings 1010 enabling the base of the shaft 120 to shift relative to the deck structure 114. As such, the slide bearings 1010 may enable the deck structure 114 to flex independent of the base of the shaft 120.

Figure 11:
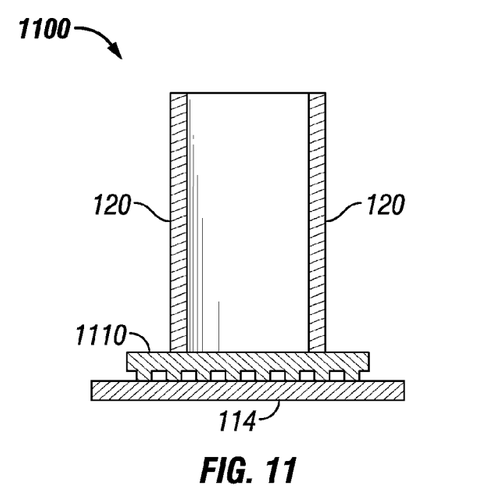

Referring to FIG. 11, an embodiment of a coupling mechanism 1100 for coupling the base of the shaft 120 to the deck structure 114 is depicted. In this embodiment, the coupling mechanism 1100 may include a buffer panel 1110 between the deck structure 114 and the base of the shaft 120. The buffer panel 1110 may be fixed to the base of the shaft 120. In an embodiment, the buffer panel 1110 is attached to the lower deck structure 114 is a way that enables the buffer panel to shift relative to the lower deck structure 114. Alternatively, the buffer panel 1110 may be formed from a flexible material that enables the buffer panel 1110 to flex. As such, the buffer panel 1110 may enable the deck structure 1110 to flex independent of the base of the shaft 120.

In should be noted that the coupling mechanisms described with reference to FIGS. 8-11 are for illustrative purposes only. In some embodiments, other coupling mechanisms may be used that permits the deck structure 114 to flex independent of the shaft 120 as would be recognized by one or ordinary skill in the art having the benefit of this disclosure. Further, combinations of the brackets 810, the tie-rods 910, the slide bearings 1010, the buffer panel 1110, or another type of attachment mechanism, may be used to couple the shaft 120 to the deck structure 114.

Figure 12:
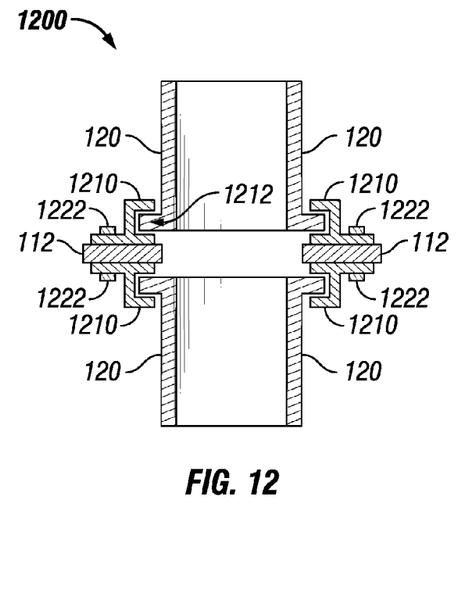
FIGS. 12-15 are diagrams depicting embodiments of a coupling mechanism for coupling a shaft usable with a lift system to an intermediate deck structure.

Referring to FIG. 12, an embodiment of a coupling mechanism 1200 for coupling the shaft 120 to the deck structure 112 is depicted. In this embodiment, the coupling mechanism 1200 may include one or more brackets 1210. The brackets 1210 may be fixed to the deck structure 112 using one or more fasteners 1222. Further, as depicted in FIG. 12, the shaft 120 may be constructed from a plurality of tube-like structures vertically stacked. One tube-like structure may be coupled to each side of the deck structure 112 to form the complete shaft 120. Each tube-like structure may include a portion that complements a u-shaped portion 1212 of the one or more brackets 1212. The u-shaped portion 1212 may loosely fit the shaft 120, enabling the deck structure 112 to flex independent of the shaft 120 while still retaining the shaft 120.

Figure 13:
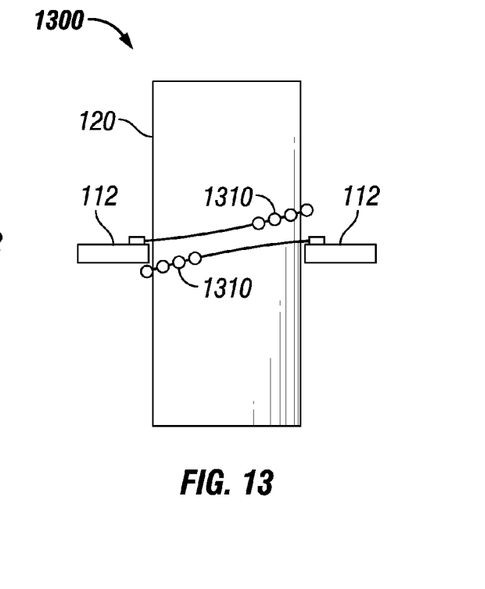

Referring to FIG. 13, an embodiment of a coupling mechanism 1300 for coupling the shaft 120 to the deck structure 112 is depicted. In this embodiment, the coupling mechanism 1300 may include one or more cords 1310 that resist tension forces. Flexing in the deck structure 112 may be absorbed in the cords 1310, thereby enabling the deck structure 112 to flex independent of the shaft 120.

Figure 14:
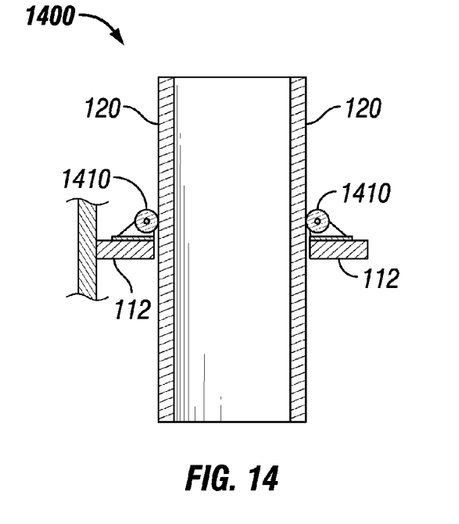

Referring to FIG. 14, an embodiment of a coupling mechanism 1400 for coupling the shaft 120 to the deck structure 112 is depicted. In this embodiment, the coupling mechanism 1400 may include one or more rotational bumpers 1410. As the deck structure 112 flexes, the rotational bumpers 1410 may roll along the shaft 120 without transferring the flexing force to the shaft 120.

Figure 15:
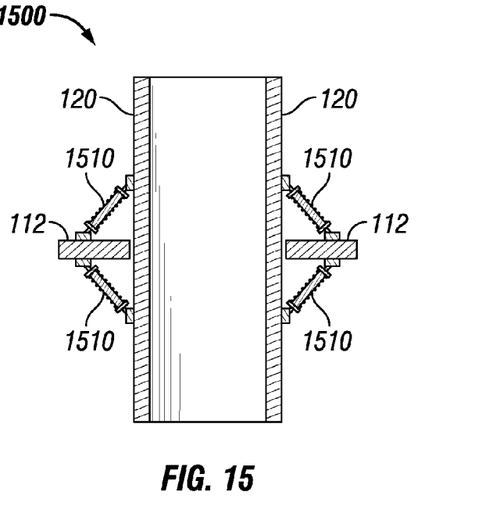

Referring to FIG. 15, an embodiment of a coupling mechanism 1500 for coupling the shaft 120 to the deck structure 112 is depicted. In this embodiment, the coupling mechanism 1500 may include one or more tie-rods 1510 having flexible inline elements, which may be elastomeric elements. The flexible elements of the tie-rods 1510 may absorb a flexing force from the decks structure 112, thereby enabling the deck structure 112 to flex independent of the shaft 120.

In should be noted that the coupling mechanisms described with reference to FIGS. 12-15 are for illustrative purposes only. In some embodiments, other coupling mechanisms may be used to permit the independent flexing of the deck structure 112 with respect to the shaft 120 as would be appreciated by one of ordinary skill in the art having the benefit of this disclosure. Further, combinations of the brackets 1210, the cords 1310, the rotational bumpers 1410, the tie-rods 1510, or another type of attachment mechanism, may be used to couple the shaft 120 to the deck structure 112.

Although various embodiments have been shown and described, the present disclosure is not so limited and will be understood to include all such modifications and variations are would be apparent to one skilled in the art.

What is claimed is:

1. An elevator system comprising:
   a shaft extending between at least two decks of a vehicle,
      a base of the shaft mounted to a first deck structure of the at least two decks by a coupling mechanism that accommodates flexing of the first deck structure to enable the first deck structure to flex independently of the base of the shaft;
   a cab within the shaft, the cab movable between the at least two decks; and
   a pneumatic system in selective communication with an interior of the shaft, the pneumatic system operable to move the cab.

2. The system of claim 1, wherein the pneumatic system comprises:
   a vacuum pump that generates a pneumatic force; and
   a noise-reducing enclosure surrounding the vacuum pump.

3. The system of claim 1, wherein the pneumatic system comprises:
   a valve that generates a pneumatic force using a pressure differential between a cabin of the vehicle and an exterior of the vehicle.

4. The system of claim 1, wherein the pneumatic system comprises:
   a valve that generates a pneumatic force using bleed air generated by a turbine engine.

5. The system of claim 1, further comprising:
   a vehicle waste system, wherein the pneumatic system is part of the vehicle waste system.

6. The system of claim 1, further comprising:
   an emergency escape rope fixed to a top of the shaft; and
   an emergency hatch in at least one surface of the cab to enable egress of passengers and crewmembers.

7. The system of claim 1, wherein the cab comprises tension cables suspending a floor of the cab from a ceiling of the cab.

8. The system of claim 1, wherein the cab, the shaft, or both are constructed from a fiber-wound material.

9. The system of claim 1, wherein the shaft is constructed from a honeycomb panel material.

10. The system of claim 1, the coupling mechanism further comprising a bracket with a U-shaped portion that complements a shape of the base of the shaft, a tie-rod, a slide-bearing, a buffer panel, or any combination thereof.

11. The system of claim 1, the shaft mounted to a second deck structure of the at least two decks with a second coupling mechanism that accommodates flexing of the second deck structure to enable the second deck structure to flex independently of the shaft.

12. The system of claim 11, the second coupling mechanism further comprising a bracket with a U-shaped portion that complements a shape of the base of the shaft, a tie-rod, a cord that resists tension forces, a rotational bumper, or any combination thereof.

13. A method of installing an elevator system, the method comprising:
mounting a base of a shaft to a first deck structure of a vehicle with a coupling mechanism that accommodates flexing of the first deck structure to enable the first deck structure to flex independently of the base of the shaft;
installing a cab within the shaft;
providing a pneumatic system in selective communication with an interior of the shaft, the pneumatic system operable to move the cab.

14. The method of claim 13, wherein mounting the base of the shaft to the first deck structure comprises:
positioning at least one bracket with a U-shaped portion that complements a shape of the base of the shaft to retain a portion of the base of the shaft; and
fixing the at least one bracket to the first deck structure, the coupling mechanism including the at least one bracket.

15. The method of claim 13, wherein mounting the base of the shaft to the first deck structure comprises:
attaching the base of the shaft to the first deck structure with at least one tie-rod having elastomeric dampers, the coupling mechanism including the at least one tie-rod.

16. The method of claim 13, wherein mounting the base of the shaft to the first deck structure comprises:
attaching the base of the shaft to the first deck structure with at least one slide bearing, the coupling mechanism including the at least one slide bearing.

17. The method of claim 13, wherein mounting the base of the shaft to the first deck structure comprises:
attaching a buffer panel to the first deck structure; and
fixing the base of the shaft to the buffer panel, the coupling mechanism including the buffer panel.

18. The method of claim 13, further comprising:
mounting the shaft to a second deck structure of the vehicle with a second coupling mechanism that enables the second deck structure to flex independently of the shaft.

19. The method of claim 18, wherein mounting the shaft to the second deck structure comprises:
attaching the shaft to the second deck structure using at least one cord that resists tension forces, the second coupling mechanism including the at least one cord.

20. The method of claim 18, wherein mounting the shaft to the second deck structure comprises:
mounting the shaft to the second deck structure with at least one rotational bumper that retains the shaft within an opening in the second deck structure while enabling the shaft to move in a direction perpendicular to the second deck structure, the second coupling mechanism including the rotational bumper.

* * * * *